May 28, 1957 J. J. BATES 2,793,462
ARTIFICIAL FISH LURE
Filed Feb. 16, 1953 2 Sheets-Sheet 2
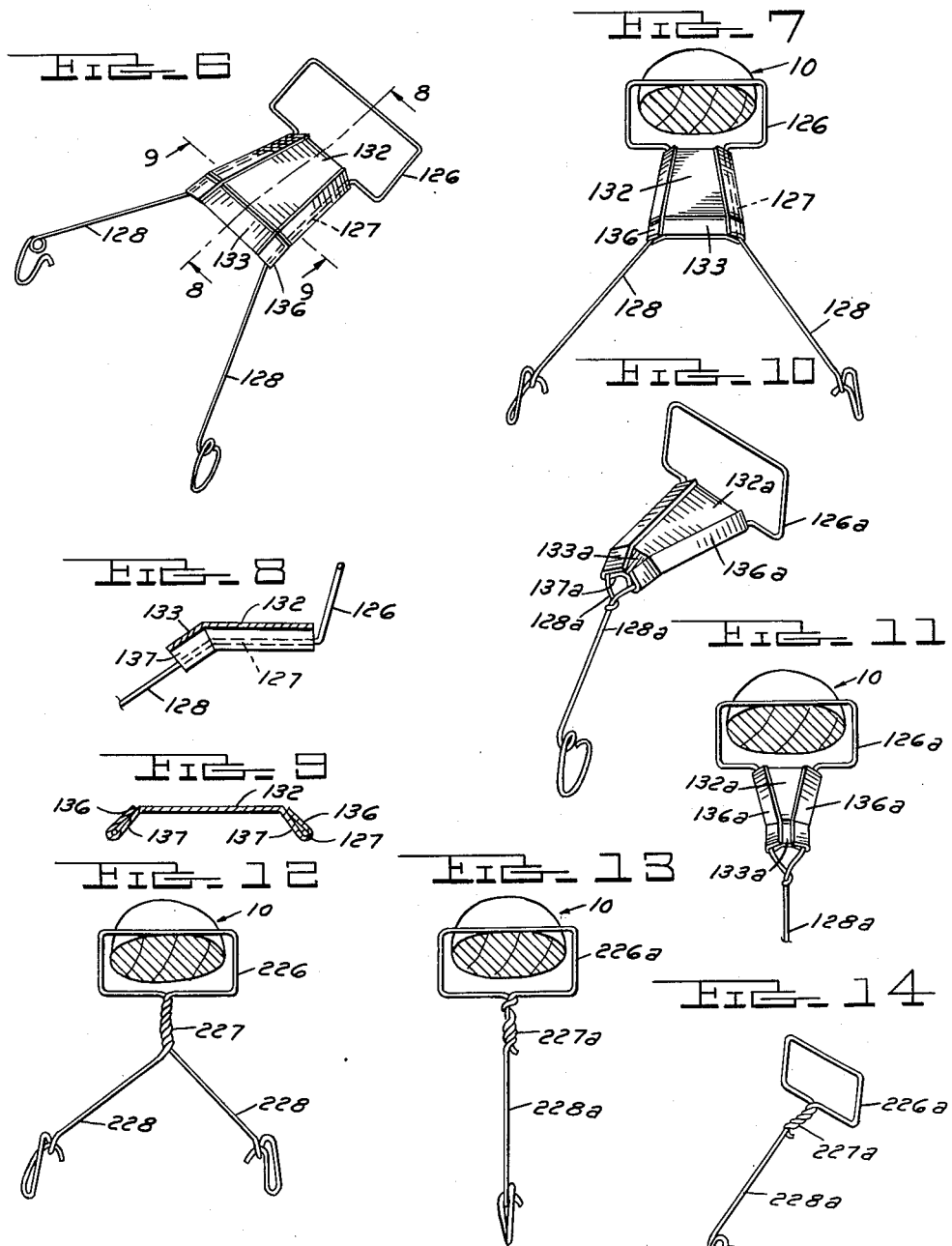

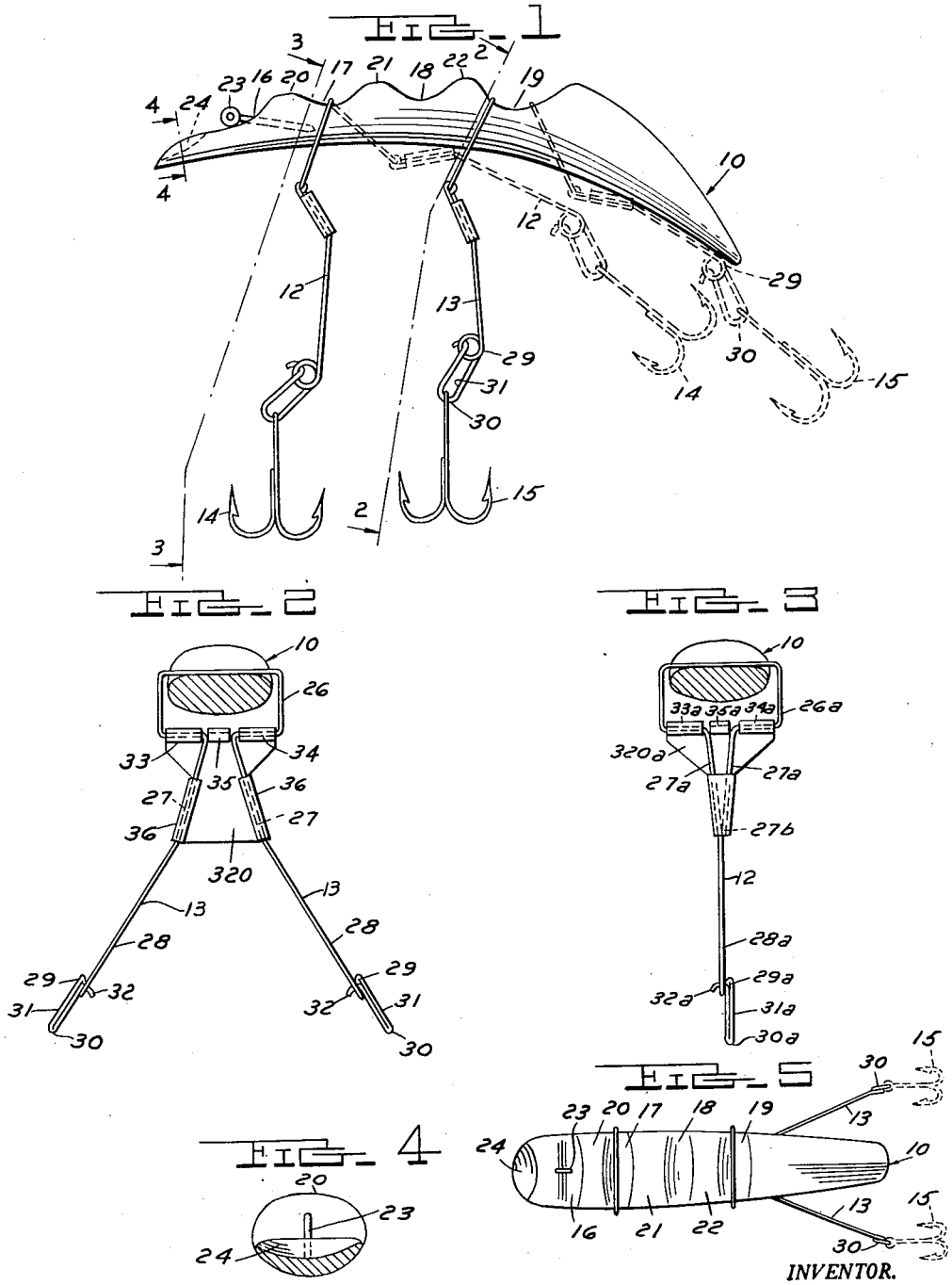

United States Patent Office 2,793,462
Patented May 28, 1957

2,793,462

ARTIFICIAL FISH LURE

John J. Bates, Grayling, Mich.

Application February 16, 1953, Serial No. 337,054

9 Claims. (Cl. 43—42.44)

This invention relates to fish lures and more particularly to an improved artificial fish lure embodying a novel hook harness which is capable of motion relative to the fish lure body itself whereby the fish lure, when in water, has a motion similar to that of a live specimen such as a minnow. This application constitutes a continuation-in-part of my co-pending application Serial No. 226,026, filed May 12, 1951, now abandoned.

The prior art is replete with fish lures and hook harnesses associated with the fish lures, the harnesses usually comprising an eyelet screwed into the body of the lure and from which a hook is suspended. This manner of securing a hook to a lure does not permit relative motion of the lure body and the harness. The screw-eye manner of suspending hooks from a lure body has other major disadvantages among which is the great difficulty experienced in changing a hook in the event it should become damaged. The change of hooks involves unscrewing the screw-eye from the body and substituting another screw-eye having a hook attached. The use and substitution of screw-eyes allows moisture to enter the interior of the fish lure body, and ultimately, the lure deteriorates. Most anglers do not carry a supply of screw-eyes with them so that once a hook becomes damaged, the lure is discarded which results in a loss of the purchase price.

Another disadvantage of prior art lures is that the hooks cannot be removed from the lure or harness when the lure is placed in a tackle box. As a result, the hooks of one lure frequently become entangled with hooks of another lure or in lines and this objectionable feature is a constant source of annoyance and irritation to the fisherman.

With the foregoing in view a primary object of this invention is to provide a combined artificial fish lure body and harness having a motion in water which simulates the motion of a live specimen.

A further object of the invention is to provide an artificial fish lure controllable as to depth during trolling or retrieving.

A further object of the invention is to provide an artificial fish lure whose lateral motion is controllable during trolling or retrieving.

Another object of the invention is to provide a hook harness for an artificial fish lure which may be secured to the lure without penetrating the surface of the lure.

Another object of the invention is to provide an artificial fish lure with a hook harness freely supported on the lure body so that the harness and hooks may move freely relative to the lure body.

Another object of the invention is to provide an artificial fish lure with a hook harness embodying means facilitating hook removal and replacing.

An additional object of the invention is to provide an artificial fish lure which has a natural swimming balance during use which assures maximum luring qualities coupled with action control responsive to the rate of trolling and rate of retrieving.

Various other objects and advantages of the invention will be specifically pointed out or will become apparent from a reading of the specification in conjunction with the accompanying drawings in which:

Fig. 1 is a side elevational view of the artificial fish lure;

Fig. 2 is a partially cross-sectional view taken on the line 2—2 of Fig. 1;

Fig. 3 is a partially cross-sectional view taken on the line 3—3 of Fig. 1;

Fig. 4 is a cross-sectional view taken on the line 4—4 of Fig. 1 with the harness omitted;

Fig. 5 is a reduced top plan view of the fish lure;

Fig. 6 is a perspective view of a modified form of harness;

Fig. 7 is a partially cross-sectional view of the lure body provided with the modified harness shown in Fig. 6;

Fig. 8 is a cross-sectional view taken on the line 8—8 of Fig. 6;

Fig. 9 is a cross-sectional view taken on the line 9—9 of Fig. 6;

Fig. 10 is a perspective view of a modified hook harness adapted to support only one hook;

Fig. 11 is partially cross-sectional view of the lure body provided with the hook harness shown in Fig. 10;

Fig. 12 is a partially cross-sectional view of the lure body provided with a further modified form of hook harness;

Fig. 13 is a view similar to Fig. 12 and showing a still further modified harness adapted to support only one hook; and Fig. 14 is a perspective view of the hook harness shown in Fig. 13.

Referring now to the drawing wherein like numerals refer to like and corresponding parts throughout the several views, the particular artificial bait disclosed for the purpose of illustrating the invention comprises a body 10, a screw-eye 23 secured to the body to which a fishing line (not shown) may be secured, hook harnesses 12, 13 loosely embracing the body, and hooks 14, 15 removably supported by the harnesses.

More particularly, the artificial lure consists of a body 10 which may be made from wood or plastic and which may be arcuate in configuration as shown in Fig. 1. The body 10 is wider at the forward end than at the rearward end and is thicker at the rearward end than at the forward end. The sides of the lure body are outwardly bowed in cross section and the bottom of the body 10 is gently rounded so that the lure will always tend to lie upright in the water.

Along the back of the lure body are a number of longitudinally spaced dished portions 16, 17, 18, and 19 separated by ridges 20, 21, and 22, the dished portions being gently rounded at their bottoms and having a more abrupt wall at the rear of the dished portions than at the front thereof. Adjacent the bottom of dished portion 16 is the screw-eye 23 to which a fishing line may be tied. The forward end of body 10 is transversely dished as at 24 to provide the body with a fairly sharp leading edge 25.

When the lure body is floating on the surface of the water it is in a balanced condition and, due to the rounded bottom and dished back construction and the position of the hooks, it always remains in the upright position both while floating and during trolling or retrieving operations. The particular shape of the lure body has been developed to accomplish controllable surface and depth characteristics as well as lateral control during retrieving or trolling operations. Due to the dished portion 24 at the forward end of the body and the abrupt rear walls of the other dished portions, the lure body, when pulled through water, dives and weaves in a realistic or life-like manner. For example, it has been determined that when the lure is trolled at a fairly slow rate of speed, a combined porpoising and lateral weaving or gyration takes place substantially at the surface of the water. When the lure is trolled or retrieved at a somewhat faster rate of speed, the combined porpoising and lateral weaving takes place below the surface of the water. When angling for particular species of fish it is sometimes desirable to jerk the line while retrieving the lure to produce a popping or chugging effect. Jerking the line when retrieving the instant lure will produce a chugging effect in addition to the porpoising and gyration thereby imparting a remarkably lifelike action to the lure.

To impart an even more realistic appearance to the lure, the particular hook harnesses illustrated have been devised. In Fig. 2 is disclosed on form of an improved hook harness which comprises a single strand of stiff but formable wire bent to form a preferably rectangular loop 26 which is appreciably wider than the lure body 10. The loop 26 is appreciably deeper than the depth of the body from the bottom of the dished portions to the bottom of the body, but is considerably less deep than the depth of the body from the tops of the ridges to the bottom of the body.

Adjacent the center of the bottom bar of the loop 26, the ends of the wire are bent downwardly and outwardly to form intermediate arm portions 27 and from these portions the wire is bent farther outwardly to form extensions of arm portions 27 and may be termed spreader arm portions 28. Adjacent the ends of the extensions or spreader arms the wires are looped as at 29 and reversely bent as at 30 to form hook supports 31 (see Fig. 1). The ends of the wire terminate in hooked portions 32 which may be snapped into the loops 29 to prevent loss of the hooks 14 supported by hook supports 31.

To prevent the hook harness from being pulled loose from the lure body, a metal retaining plate 320 is provided which is equipped with rolled edges 33 and 34 into which the lower bars of the loop 26 are inserted. An additional rolled edge 35 is provided at the top of the plate 320 and it serves to prevent movement of the outside bars of the loop toward each other and in this manner the size of the loop 26 is preserved. The lower sides of the plate 320 are provided with rolled edges 36 into which intermediate arm portions 27 are inserted and retained. As illustrated in Fig. 2, the arm portions of the harness are angulated away or diverge from each other. The amount of angulation is preferably just sufficient to prevent hooks 14, 15 from becoming entangled with each other.

To mount the hook harness on the body, the formed wire is slipped over the body to the desired position with the top bar of loop 26 lying in one of the dished portions of the body. The metal plate is then placed in position and the proper wire portions of the harness placed adjacent corresponding edges of the metal plate. The edges of the plate are then rolled over the wire portions to securely retain the wire in place. The rolled portion 35 may be formed either before or after the metal plate is secured to the harness. The loop 26 is loosely retained on the body so that it may slide around in the dished portion but may not slip off the body. Hooks 15 may be placed on hook supports 31, the end portions 32 snapped into the loops 29, and the lure is then ready for use.

The hook harness just described is adapted to support two three-pronged hooks. Some states have fishing laws which restrict the number of hooks one may use on a single line. To enable anglers to avail themselves of the benefits of the instant hook harness and comply with state laws, the harness illustrated in Fig. 3 has been devised to provide support for only one hook. This particular harness has a loop 26a formed similarly to loop 26, except that the depending intermediate arm portions 27a converge rather than diverge. One of the intermediate arm portions is cut short as at 27b while the other arm is provided with an extension bent to hang vertically and form hook arm 28a. Hook arm 28a has a loop 29a formed adjacent its end and is reversely bent as at 30a to form a hook support 31a. The end of the wire terminates in a hook portion 32a adapted to be snapped into loop 29a to form a closed loop to support hook 14. The hook harness is provided with a plate 320a equipped at its upper end with rolled edge portions 33a, 34a, and 35a which function the same as the corresponding rolled edge portions of the hook harness illustrated in Fig. 2. The lower portion of plate 320a is wrapped around the intermediate arm portions 27a and securely retains them in place. If desired, the end portions 27b of arm 27a may be hooked outside the bottom of the plate to insure against arm 27a pulling out of the plate.

Installation of hook harness 12 is done by slipping loop 26a over the body 10 to the desired position in one of the dished portions, securing the plate to the harness, and placing the hook in the hook support.

Figs. 6 through 9 illustrate a modification of the hook harness which comprises a loop 126 wider than the width of lure body 10. The ends of the wires adjacent the center of the lower bar are bent downwardly and outwardly to form intermediate arm portions 127. The wires are bent and angled at the ends of intermediate arm portions 127 to form extensions or spreader arms 128, these arms terminating in hook supports similar to those disclosed in Figs. 1, 2, and 3.

The hook harness illustrated in Figs. 6 through 9 is provided with a metal retaining plate 132 which preserves the size of the loop 126 and maintains the position of the arms of the harness. Plate 132 has beaded, offset edges 136 which are formed by bending the edges of the plate practically vertically to the plane of the plate and then reversely bending the edges to form offset rolled edges. The length of plate 132 is longer than the length of intermediate arm portions 127 for a purpose presently to be pointed out.

To mount the hook harness just described on line body 10, the loop 126 is slipped over the body to a selected dished portion in the body. The side edges of the plate 132 are then offset and rolled and slipped over the arm portions of the harness. Owing to the offset of the rolled edges, the arm portions 127 lie adjacent the shoulder 137 formed by bending the edges vertically to the plane of the plate. The arm portions 127 are prevented from moving toward each other by reason of the shoulders 137 and are prevented from moving outwardly by reason of the rolled edges 136. The arm portions 127 being unable to move relatively to each other, the shape and size of the loop 126 are preserved. In order to prevent any possibility of the arms 127 or 128 twisting, the plate 132 is made longer than intermediate arm portions 127 so as to include the upper portions of arms 128 within the rolled edges 136. The lower edge of plate 132 is bent as at 133 to follow the contour of arms 127 and 128. The shoulders 137, the rolled edges 136, and the bent portion 133 all cooperate to hold the wire portions of the harness in proper, non-twisting relationship.

In Figs. 10 and 11 is illustrated how a modified hook harness somewhat similar to that just described may be adapted to mount a single hook rather than two hooks. Loop 126a is formed similarly to loop 126, but the depending intermediate arm portions converge rather than diverge. A plate 132a having reversely bent edges 136a and cooperating shoulders 137a are fixed on the intermediate arm portions. The plate 132a is bent as at 133a and securely clamps the intermediate arm portions and the upper ends of spreader arm portions 128a between the edges 136a and the shoulders 137a. One of the spreader arms 128a is cut off and the stub portion thereof is hooked around the other spreader arm 128a. The uncut spreader arm terminates in a hook support formed similarly to that described in connection with Fig. 3.

Fig. 12 illustrates a modified form of the double hook harness which comprises a loop 226 adapted to be mounted on the body 10 in a loosely embracing manner. The ends of the loop adjacent the center of the bottom bar are brought together and the intermediate arm portions 227 are then wrapped about each other. The spreader arm portions 228 diverge from the wrapped intermediate arm portions 227 and terminate in hook supports. The coiled or wrapped intermediate arm portions preserve the size and shape of the loop without the necessity of a plate. Elimination of the plate enables this particular hook harness to be manufactured more economically without sacrificing the desirable characteristics of the harness.

Figs. 13 and 14 disclose a further modified hook harness somewhat similar to that of Fig. 12 adapted to support a single hook. This embodiment comprises a loop 226a having its ends brought together and the depending intermediate arm portions 227a twisted or wrapped about each other. One spreader arm portion 228 is eliminated, however, enabling the other spreader arm to hang vertically and support only a single hook. The hook harness illustrated in Figs. 13 and 14 very effectively preserve the size and shape of the loop 226a and has the advantage of being more economical due to the elimination of the plate.

In all forms of hook harness the hooks are easily removable from the harness to prevent their becoming entangled in other equipment when the harnesses are stored in a tackle box.

When trolling or retrieving the artificial bait after a cast, the dished portion 24 at the leading edge of the body 10 acts as a scoop and cooperates with the dished portions in the back of the body to make the lure dive and gyrate from side-to-side. The depth to which the bait will dive and the amount of lateral gyration depends on the rate of speed at which the lure in pulled through the water. If pulled slowly, the bait porpoises and gyrates on the surface of the water, and if pulled more rapidly, this action takes place below the surface of the water.

Owing to the loose fit of the loops 26, 26a, 126, 126a, 226, and 226a about the body 10 of the lure, the hook harnesses are free to move forwardly and rearwardly. When the bait is quietly floating the harnesses and hooks assume the position shown in full lines in Fig. 1. As the bait is pulled through the water, the hook harnesses and hooks move to the position shown in dotted lines in Fig. 1. When chugging or jerking the line the harnesses and hooks will dance between these two positions.

It has been pointed out that the loops 26, 26a, 126, 126a, 226, and 226a are wider than the body 10. This wider distance permits side-to-side action of the harnesses as the lure is pulled through the water. The side-to-side action of the harnesses is in the opposite direction of the gyration of the body. That is, as the body turns to the left, the harnesses and hooks move toward the right and in the opposite direction when the body gyrates to the right. This side-to-side action coupled with the fore and aft action produces a remarkably life-like action of the lure which experts consider irresistable to fish.

While the invention has been shown and described in detail, it is obvious that many changes and variations are possible within the scope of the appended claims.

I claim:

An artificial fish lure comprising an elongated body having fore and aft portions of a normal cross-sectional area and a recessed transverse intermediate interconnecting portion having a lesser cross-sectional area defined by in-curving body walls leading from said fore and aft portions, a wire loop frame loosely surrounding said body in said recessed portion and confined to said portion by the curving walls defining said area and adapted for movement in said area so that said body and said loop frame are capable of movement relative to one another, and means connected to said loop frame for attaching a fish hook adjacent said body.

2. A fishing lure comprising a body having front and rear ends and a reduced portion intermediate its ends, a frame surrounding said body reduced portion of a dimension greater than said reduced portions so as to be loosely associated therewith and of a dimension lesser than said body ends so as to be confined in said body reduced portion, and means providing a hook connection on said frame.

3. In a device as set forth in claim 2, said frame consisting of a length of wire bent intermediate ends in an encompassing loop and connected together below said body, said wire ends outward of their connection constituting the hook connection means.

4. In a device as set forth in claim 3, said wire being connected together by intertwining.

5. In a device as set forth in claim 3, said wire being connected together by a clip.

6. In a device as set forth in claim 3, said wire ends extending from their loop forming point of connection in two hook supporting means.

7. A fish lure comprising a body having front and rear ends and a reduced portion intermediate its ends; said body being so otherwise shaped to cause darting and swimming movements when moved through water; a frame loosely surrounding said body in the area of said reduced portion of a dimension greater than said reduced portion and of a dimension lesser than said body ends so as to be confined in said body reduced portion area; said body being capable of motion relative to said frame so as to be capable of darting and swimming movements within said frame; and hook supporting means depending from said frame.

8. An artificial fish lure comprising an elongated body having fore and aft portions of a normal cross-sectional area and a dished intermediate interconnecting portion having a lesser cross-sectional area defined by in-curving body walls leading from said fore and aft portions, a wire loop frame loosely surrounding said body in said dished portion and confined in said dished portion by the in-curving walls defining said portion and adapted for movement in said dished portion so that said body and said loop frame are capable of movement relative to one another, and means connected to said loop frame for attaching a fish hook adjacent said body.

9. In a device as set forth in claim 8, said loop frame having at least one extending arm, and means on said arm adapted to secure at least one hook thereto.

References Cited in the file of this patent

UNITED STATES PATENTS

| | | |
|---|---|---|
| 765,482 | Hardy | July 19, 1904 |
| 872,934 | Harig | Dec. 3, 1907 |
| 1,227,325 | Schilling | May 22, 1917 |
| 1,876,275 | Cummins | Sept. 6, 1932 |
| 2,157,003 | Mussina | May 2, 1939 |
| 2,159,230 | Sage | May 23, 1939 |
| 2,229,259 | Sherwood | Jan. 21, 1941 |
| 2,415,742 | Hiltabidel et al. | Feb. 11, 1947 |
| 2,512,914 | Boice | June 27, 1950 |
| 2,587,366 | Montali | Feb. 26, 1952 |